(12) United States Patent
Posamentier

(10) Patent No.: US 8,686,839 B2
(45) Date of Patent: Apr. 1, 2014

(54) CLOSED-LOOP HAPTIC OR OTHER TACTILE FEEDBACK SYSTEM FOR MOBILE DEVICES, TOUCH SCREEN DEVICES, AND OTHER DEVICES

(75) Inventor: Joshua Posamentier, Oakland, CA (US)

(73) Assignee: Texas Instruments Incorporated, Dallas, TX (US)

( * ) Notice: Subject to any disclaimer, the term of this patent is extended or adjusted under 35 U.S.C. 154(b) by 315 days.

(21) Appl. No.: 13/286,358

(22) Filed: Nov. 1, 2011

(65) Prior Publication Data

US 2013/0106589 A1     May 2, 2013

(51) Int. Cl.
*H04B 3/36* (2006.01)
*G08B 6/00* (2006.01)
*G06F 3/041* (2006.01)
*G06F 3/01* (2006.01)

(52) U.S. Cl.
CPC .................................. *G06F 3/016* (2013.01)
USPC .................. 340/407.1; 340/407.2; 345/173

(58) Field of Classification Search
None
See application file for complete search history.

(56) References Cited

U.S. PATENT DOCUMENTS

| 5,103,404 | A  | * | 4/1992  | McIntosh ................. 318/568.22 |
| 5,436,622 | A  | * | 7/1995  | Gutman et al. ................. 340/7.6 |
| 8,210,942 | B2 | * | 7/2012  | Shimabukuro et al. ......... 463/30 |
| 8,310,188 | B2 | * | 11/2012 | Nakai ...................... 318/400.29 |
| 8,475,172 | B2 | * | 7/2013  | Lieberman et al. ........... 434/258 |
| 2008/0058835 | A1 | * | 3/2008 | Farritor et al. ................ 606/130 |
| 2009/0278819 | A1 |   | 11/2009 | Goldenberg et al. |
| 2010/0026219 | A1 | * | 2/2010 | Nakai ....................... 318/400.11 |
| 2010/0160016 | A1 | * | 6/2010 | Shimabukuro et al. ......... 463/16 |
| 2011/0084943 | A1 | * | 4/2011 | Berkley et al. ................ 345/184 |
| 2011/0260996 | A1 | * | 10/2011 | Henricson .................... 345/173 |
| 2012/0038568 | A1 | * | 2/2012 | Colloms et al. ............... 345/173 |
| 2013/0088342 | A1 | * | 4/2013 | Ahn et al. .................. 340/407.1 |
| 2013/0108995 | A1 | * | 5/2013 | DePasqua et al. ............. 434/236 |
| 2013/0110195 | A1 | * | 5/2013 | Fletcher et al. ................ 607/46 |
| 2013/0154814 | A1 | * | 6/2013 | Pance et al. ................ 340/407.2 |

OTHER PUBLICATIONS

"Haptics Design Guide, Application Note QTAN0085", Atmel Corporation, 2011, 10 pages.

* cited by examiner

*Primary Examiner* — Julie Lieu
(74) *Attorney, Agent, or Firm* — Eugene C. Conser; Wade J. Brady, III; Frederick J. Telecky, Jr.

(57) ABSTRACT

A system includes an actuator configured to generate vibrations for creating tactile feedback to a user. The system also includes a sensor configured to measure the vibrations generated by the actuator. The system further includes a tactile feedback system configured to drive the actuator in order to generate the vibrations. The tactile feedback system is configured to adjust the driving of the actuator in response to measurements from the sensor. The actuator could include a motor configured to drive an eccentric mass, and the sensor could include an accelerometer and/or a gyroscope. Among other things, the tactile feedback system could be configured to over-drive a motor of the actuator until the measurements from the sensor indicate that vibrations are detected by the sensor and to back-drive the motor of the actuator until the measurements from the sensor indicate that no vibrations are detected by the sensor.

17 Claims, 3 Drawing Sheets

CLOSED-LOOP HAPTIC OR OTHER TACTILE FEEDBACK SYSTEM FOR MOBILE DEVICES, TOUCH SCREEN DEVICES, AND OTHER DEVICES

TECHNICAL FIELD

This disclosure is generally directed to user interfaces. More specifically, this disclosure is directed to a closed-loop haptic or other tactile feedback system for mobile devices, touch screen devices, and other devices.

BACKGROUND

Many electronic devices support the use of haptic or other tactile feedback. For example, many portable electronic devices include touch-sensitive screens (referred to as "touch screens"), and touch screens supporting haptic feedback allow users to feel vibrations when the users contact the touch screens. As a particular example, haptic feedback could allow a user to feel vibrations when the user invokes a particular function of an electronic device.

Haptic or other tactile feedback is often created in an electronic device using a simple, open-loop approach. For instance, a voltage can be applied to a motor that rotates an eccentric mass at an appropriate frequency, which makes the entire device vibrate. In more advanced systems, a motor's drive signal can be turned on and off with millisecond granularity, but this is still done in an open-loop fashion. A motor often has significant inductance and significant inertia, preventing an instantaneous response and creating high latency for the tactile feedback (often more than 50 ms), which is easily perceptible.

BRIEF DESCRIPTION OF DRAWINGS

For a more complete understanding of this disclosure and its features, reference is now made to the following description, taken in conjunction with the accompanying drawings, in which.

DETAILED DESCRIPTION

Figure 1:
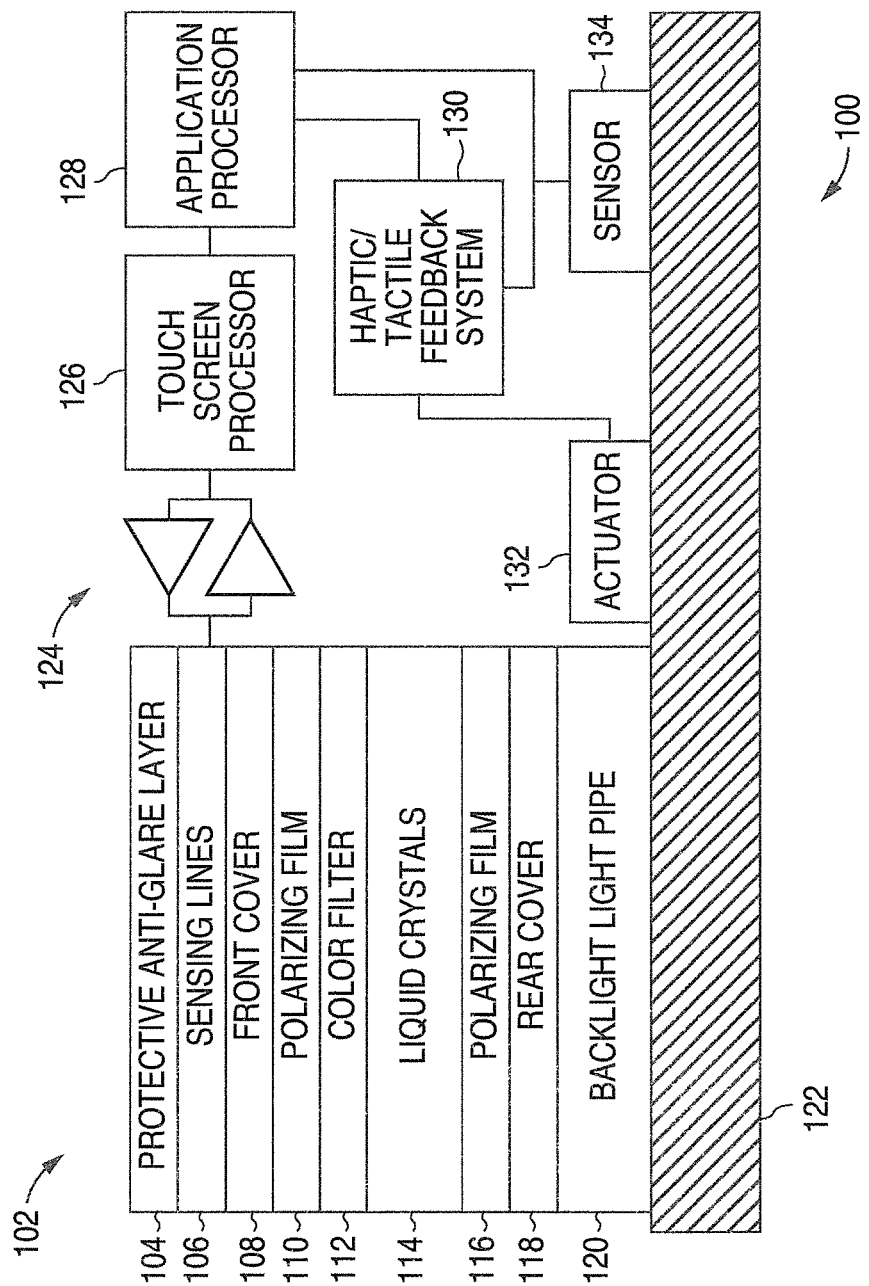
FIG. 1 illustrates an example system supporting closed-loop haptic or other tactile feedback in accordance with this disclosure.
Figure 2A:
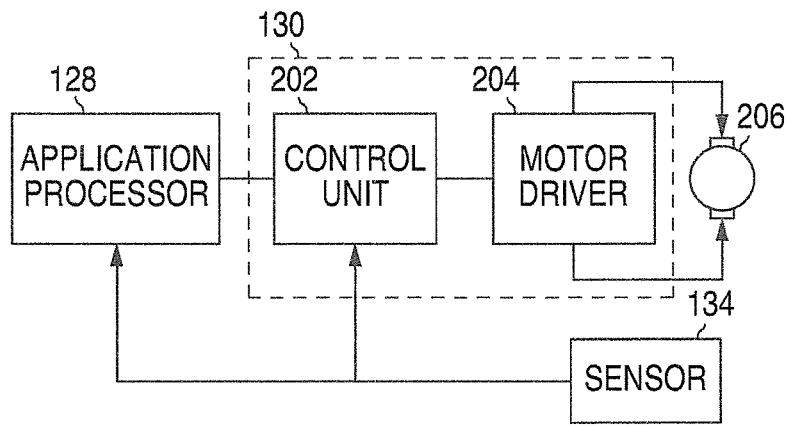
FIGS. 2A and 2B illustrate an example closed-loop haptic or other tactile feedback system in accordance with this disclosure.
Figure 2B:
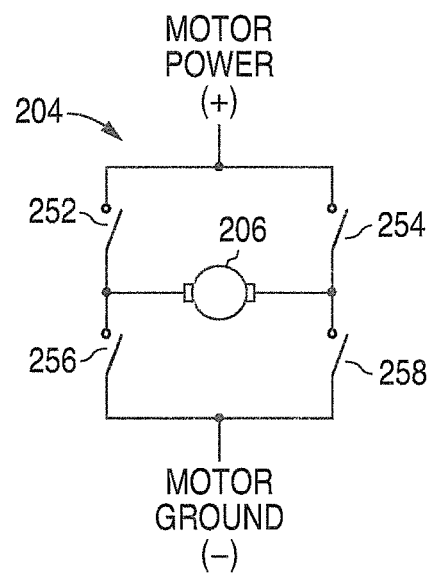
Figure 3:
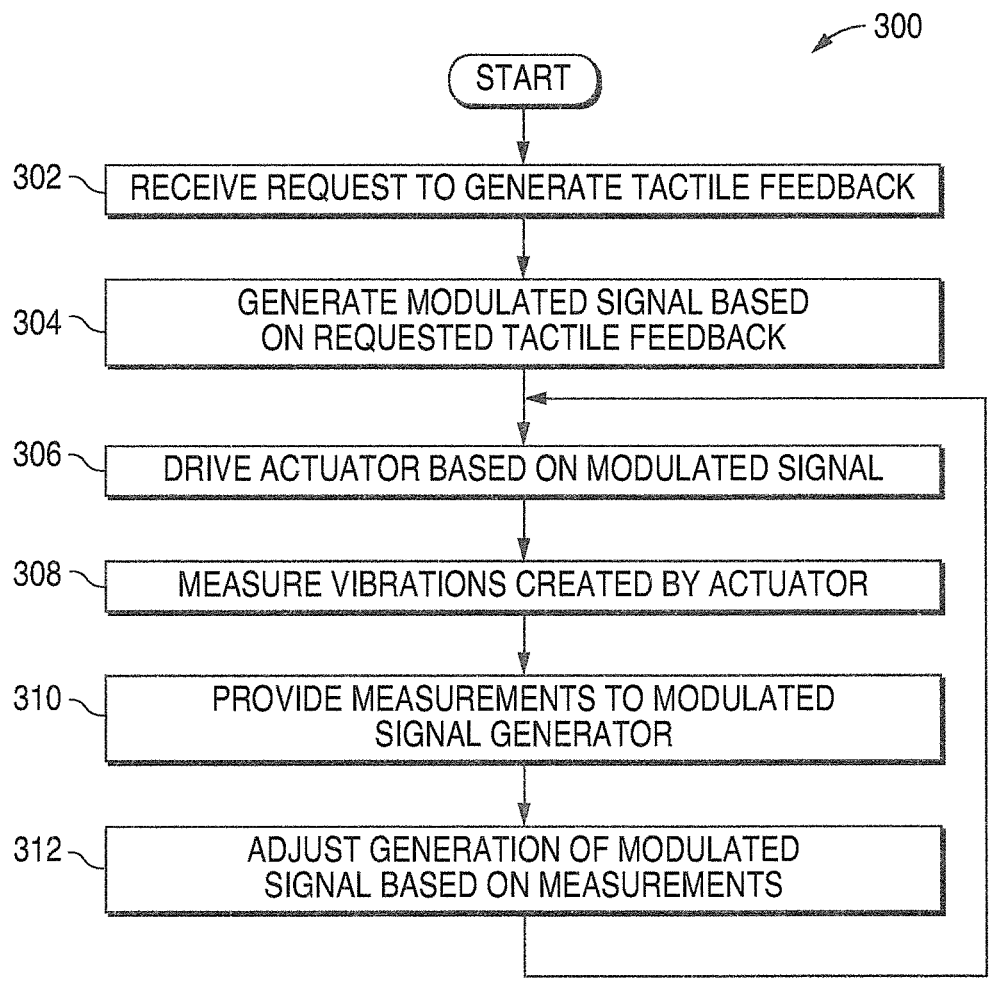
FIG. 3 illustrates an example method for providing closed-loop haptic or other tactile feedback in accordance with this disclosure.

FIGS. 1 through 3, described below, and the various embodiments used to describe the principles of the present invention in this patent document are by way of illustration only and should not be construed in any way to limit the scope of the invention. Those skilled in the art will understand that the principles of the present invention may be implemented in any type of suitably arranged device or system.

FIG. 1 illustrates an example system 100 supporting closed-loop haptic or other tactile feedback in accordance with this disclosure. In this particular example, the system 100 supports the use of closed-loop haptic or other tactile feedback with a device having a touch screen. However, this is for illustration only. Haptic or other tactile feedback can be used with any other suitable device or system, including those without touch screens. Also, haptic or other tactile feedback can be used with any portion of a device or with the entire device itself. For instance, tactile feedback could be used to vibrate an entire device, a touch screen of the device, buttons of the device, or any other component(s) of the device.

As shown in FIG. 1, the system 100 includes a touch screen 102. The touch screen 102 generally represents a graphical display that receives input through contact with one or more external objects. The external objects could include a user's finger(s), a stylus, or any other suitable object(s). The touch screen 102 could use any suitable technology to detect contact with an external object. Example touch screens 102 include resistive touch screens, capacitive touch screens, surface acoustic wave touch screens, infrared touch screens, and optical touch screens.

In this example, the touch screen 102 includes a touch interface that is formed by a protective anti-glare layer 104 and sensing lines 106. The anti-glare layer 104 helps to reduce glare on the touch screen 102 while protecting the underlying structures. The sensing lines 106 are used to help identify one or more locations where the touch screen 102 is contacted by a user. The sensing lines 106 could, for example, include capacitive or resistive lines depending on the type of touch screen being used.

The touch screen 102 also includes a display formed by a front cover 108, a polarizing film 110, an optional color filter 112, liquid crystals 114, a polarizing film 116, a rear cover 118, and a backlight light pipe 120. The front cover 108 and the rear cover 118 provide support for and encase other structures of the display and can be formed from any suitable material(s), such as glass. The polarizing films 110 and 116 polarize light passing through the touch screen 102, and often the films 110 and 116 have perpendicular transmission axes. The color filter 112 can filter particular colors from light passing through the touch screen 102. The color filter 112 may be omitted, however, such as when the touch screen 102 supports field sequential color (FSC). The liquid crystals 114 represent molecules that can be realigned to control the passage of light between the polarizing films 110 and 116. The backlight light pipe 120 provides light from an external source (such as one or more light emitting diodes) to the touch screen 102.

Each of the structures in the touch screen 102 could be formed from any suitable material(s) and in any suitable manner. Also, each of the structures in the touch screen 102 could have any suitable size, shape, and dimensions. Note that the structures in the touch screen 102 shown in FIG. 1 are not drawn to scale.

The touch screen 102 includes or is mounted on a mechanical connection 122. The connection 122 includes any suitable mechanism for mechanically connecting the touch screen 102 to a case, printed circuit board, or other structure. Note, however, that the touch screen 102 could be mounted directly on a case, printed circuit board, or other structure in a mobile telephone or other device. Also note that other components could be placed between the touch screen 102 and the mechanical connection 122, such as haptic or other tactile feedback actuators formed from strips of ceramic or other piezo-electric material(s). When the touch screen 102 is mounted on top of piezo-electric or other actuators, this can result in an actuated touch screen (as opposed to actuators that actuate or vibrate an entire device).

In this example, the sensing lines 106 of the touch interface are coupled via drivers 124 to a touch screen processor 126. The touch screen processor 126 analyzes signals from the touch interface to identify any location(s) where the touch screen 102 is being touched. Depending on the implementation, the touch screen processor 126 could use changes in capacitance, resistance, or other technique to identify the location(s) where the touch screen 102 is being touched.

The touch screen processor 126 includes any suitable structure for identifying information related to how a touch screen is being contacted. The touch screen processor 126 could, for instance, include a microprocessor, microcontroller, digital signal processor, field programmable gate array, or application specific integrated circuit. In some embodiments, the touch screen processor 126 executes software or firmware instructions to provide the desired functionality. Each of the drivers 124 includes any suitable structure for driving signals to an intended destination.

The touch screen processor 126 outputs an identified location where the touch screen 102 is contacted to an application processor 128. The application processor 128 executes one or more applications to provide any desired functionality. For example, the application processor 128 could use the identified location(s) output by the touch screen processor 126 to initiate or accept telephone calls, send or view instant messages, allow a user to surf the Internet or play games, or any other of a wide variety of functions. The application processor 128 includes any suitable structure for executing one or more applications. The application processor 128 could, for instance, include a microprocessor, microcontroller, digital signal processor, field programmable gate array, or application specific integrated circuit.

In this example, the system 100 includes a haptic or other tactile feedback system 130 that supports the use of haptic or other tactile feedback. For example, the tactile feedback system 130 can generate signals for controlling at least one actuator 132. The actuator 132 represents a structure that generates vibrations, such as through rotation, bending, sheering, or other movement. The actuator 132 includes any suitable structure for creating movement of at least a portion of the system 100. The actuator 132 could, for example, include a motor for driving an eccentric rotating mass (ERM). While a single actuator 132 connected to the mechanical connection 122 is shown here, any suitable number and arrangement of actuators 132 in any suitable location(s) could be used.

As described in more detail below, the tactile feedback system 130 uses closed-loop control to drive the actuator 132. Part of this closed-loop control involves receiving input from a sensor 134, which can also provide input to the application processor 128 or other destination(s). The sensor 134 senses movement created by the actuator 132, such as by sensing movement in multiple dimensions created by vibrations from the actuator 132. The sensor 134 also outputs signals identifying the detected movement.

In conventional mobile devices and other devices, the sensor 134 is often used for various functions, such as to detect tilting or other movement of the device during game play or other operation. In accordance with this disclosure, the sensor 134 is also used to provide feedback about operation of the actuator 132 to the tactile feedback system 130. The tactile feedback system 130 can use this feedback in any suitable manner, such as to modify how the actuator 132 is driven.

The tactile feedback system 130 includes any suitable structure for controlling the operation of an actuator in a closed-loop manner. The sensor 134 includes any suitable structure for identifying movement of a device or system. In some embodiments, the sensor 134 represents an accelerometer, a gyroscope, or a combination accelerometer/gyroscope. In particular embodiments, the sensor 134 could represent an MPU-6000/6050 three-axis gyroscope, three-axis accelerometer from INVENSENSE, INC.

The tactile feedback system 130 can use input from the sensor 134 in any suitable manner. For example, vibration measurements from the sensor 134 can be used to build and constantly update a response model and transfer function for the actuator 132. The model represents how the actuator 132 generates vibrations in response to different drive signals. When the tactile feedback system 130 attempts to generate a specific type or amount of vibration, the tactile feedback system 130 can use the model to select the appropriate drive signal for the actuator 132. Vibration measurements from the sensor 134 can be used by the tactile feedback system 130 to verify whether the correct tactile feedback is being generated and, if not, to adjust the drive signal provided to the actuator 132. If adjustments to the drive signal are needed, the tactile feedback system 130 can update the response model so that future attempts to generate the same tactile feedback occur using the updated drive signal. Note that drive signals could be simple vibrational waveforms or more complex patterns used in games or other applications.

Use of this topology and feedback capability enables faster response from the actuator 132. For example, the actuator 132 may be heavily over-driven for the first few milliseconds of a drive signal to overcome the actuator's inductance and inertia. Once the sensor 134 senses that vibrations are occurring, the strength of the drive signal to the actuator 132 can be reduced to a nominal level. Similarly, the actuator 132 can be back-driven to brake (stop) the actuator 132 until no vibrations are detected in order to provide shorter, sharper haptic or other tactile feedback. This results in much lower response latencies, as does the implementation of the algorithms at a hardware level rather than a higher-latency user software plane. In particular implementations, latencies can be reduced from around 50 ms to about 10-15 ms or even less. This also improves conventional actuator drivers that often drive an ERM forwards and then backwards for fixed periods of time to approximate deceleration to zero velocity, which is imprecise and often results in driving the ERM in the opposite direction entirely. By using mechanical motion feedback sensed by the sensor 134, a precise and very aggressive braking action may be applied to the actuator 132 for better feel.

Another instance of how this topology and feedback capability can be used involves linear resonant actuators (LRAs). This type of actuator receives an alternating current (AC) input waveform near a specified resonance and vibrates only at that frequency. While linear resonant actuators do not operate well at other frequencies, the drive frequency could be slightly tuned to maximize the vibrations of a device. The topology and feedback capability described above can be used to sense when a linear resonant actuator is operating properly and, if not, to adjust the drive signal for the actuator.

The use of closed-loop control for a tactile feedback system can provide various advantages depending on the implementation. For example, as described above, this approach can help to reduce latency of tactile feedback so that the tactile feedback is perceived by a user more quickly. Also, since an actuator 132 implemented as a motor can be started and stopped at specific times, this approach can provide greater control of the tactile feedback and therefore provide superior tactile feedback to an end user. Further, this approach allows for the use of high quality vibrational waveforms to generate the tactile feedback, rather than just waveforms that turn the actuator 132 on and off. Beyond that, any of these benefits can often be obtained without adding any additional sensors into a typical mobile handset, gaming platform, or other device since those devices often already include an accelerometer, gyroscope, or other suitable sensor. Moreover, this approach can be implemented using very little physical space in a device, has a straightforward implementation, and can adapt to multiple changing conditions (including different devices and aging motors). In addition, the same architecture or software/firmware instructions can be used to control a wide range of actuators 132. Tuning is effectively part of the closed-loop algorithms, which decreases time-to-market.

Although FIG. 1 illustrates one example of a system 100 supporting closed-loop haptic or other tactile feedback, various changes may be made to FIG. 1. For example, any suitable touch screen 102 could be used, or the tactile feedback system 130 could be used in a device or system without a touch screen. Also, the functional division shown in FIG. 1 is for illustration only. Various components in FIG. 1 could be rearranged, omitted, combined, or further subdivided and additional components could be added according to particular needs. As a specific example, the touch screen processor 126 and the application processor 128 could be combined into a single processing unit. As another specific example, the components of the tactile feedback system 130 could be implemented using a single integrated circuit chip or other device, and the tactile feedback system 130 could form part of either or both processors 126-128.

FIGS. 2A and 2B illustrate an example closed-loop haptic or other tactile feedback system 130 in accordance with this disclosure. As shown in FIG. 2A, the tactile feedback system 130 includes a control unit 202 and a motor driver 204. In this particular example, the control unit 202 is coupled to the application processor 128 and the sensor 134. The control unit 202 controls the amount and type of tactile feedback provided by the actuator 132. For example, the control unit 202 could include a pulse width modulation (PWM) signal generator that generates different PWM signals depending on the amount and type of tactile feedback desired. This could be done using a response model as described above. The control unit 202 can also use input from the sensor 134 to modify the PWM signals or the model to provide the desired tactile feedback. It should be noted that the control unit 202 can generate other suitably modulated signals to drive the actuator 132, such as pulse frequency modulation (PFM) signals or a combination of PWM and PWM signals.

The control unit 202 represents any suitable structure for controlling and modifying tactile feedback, such as a microprocessor, microcontroller, digital signal processor, field programmable gate array, or application specific integrated circuit. In particular embodiments, the control unit 202 could represent a microcontroller or a finite state machine. Also, the control unit 202 can use any suitable control technology to generate tactile feedback, such as proportion-integral-derivative (PID) control or other type of control technique.

The motor driver 204 drives a motor 206 of the actuator 132 in order to physically generate the tactile feedback. For example, the motor driver 204 can generate electrical currents for causing the motor 206 of the actuator 132 to turn on or off. In some embodiments, the motor driver 204 generates the electrical currents for the motor 260 based on PWM or other modulated signals received from the control unit 202. The motor driver 204 includes any suitable structure for driving a motor. One example motor driver 204 is an H-bridge architecture, an example of which is shown in FIG. 2B. In FIG. 2B, four switches 252-258 and the actuator motor 206 are arranged in an H-configuration. The switches 252-254 are high-side switches, and the switches 256-258 are low-side switches. The switches 252-258 are opened and closed to connect power and ground voltages to the motor, allowing the H-bridge architecture to provide currents to either side of the motor 206 to both accelerate and brake the motor 206. Each switch 252-258 includes any suitable switching structure for forming or blocking an electrical connection, such as one or more transistors.

The type or amount of tactile feedback could be controlled by the control unit 202 based on input from the application processor 128 or other source. In some embodiments, the application processor 128 or other sub-system, such as a digital-to-analog converter (DAC), could provide an analog input signal to the control unit 202, where the analog signal defines the type or amount of tactile feedback. In other embodiments, the application processor 128 could provide a digital input signal to the control unit 202, where the digital signal defines the type or amount of tactile feedback, and a DAC could convert the digital signal into an analog signal. Any other suitable technique could be used to define the type or amount of tactile feedback to be provided.

In some embodiments, the tactile feedback system 130 can operate as follows. The motor 206 in the actuator 132 is driven by an H-bridge motor driver 204 using PWM, PFM, or other modulated signals. The desired vibration waveform or pattern is requested by the application processor 128, and the control unit 202 adaptively drives the modulated signals for the H-bridge motor driver 204. Among other things, the control unit 202 uses feedback from the sensor 134 to correct the modulated waveforms in order to achieve a desired type or amount of tactile feedback. The control unit 202 can also perform faster starts and stops of the motor 206 by overdriving and back-driving the motor 206 and monitoring vibrations detected by the sensor 134. In addition, since the sensor 134 typically has a large bandwidth, the control unit 202 can adapt the modulated signals to drive the motor 206 at non-resonance. In particular embodiments, the sensor 134 is configured to detect at least 0.1 G force along three axes, and the control unit 202 generates high-frequency PWM signals with high current. The high-frequency PWM signals could have a frequency of about ($1000 \times \omega$), where $\omega$ represents the maximum angular velocity of the motor. The high current PWM signals could have a peak current ratio of about 10:1.

Although FIGS. 2A and 2B illustrate one example of a closed-loop haptic or other tactile feedback system 130, various changes may be made to FIGS. 2A and 2B. For example, the functional division shown in FIGS. 2A and 2B is for illustration only. Various components in FIGS. 2A and 2B could be rearranged, omitted, combined, or further subdivided and additional components could be added according to particular needs. As a specific example, the motor driver 204 could be incorporated into the control unit 202. Also, other types of motor drivers could be used in the tactile feedback system 130.

FIG. 3 illustrates an example method 300 for providing closed-loop haptic or other tactile feedback in accordance with this disclosure. A tactile feedback system receives a request to generate tactile feedback at step 302. This could include, for example, the control unit 202 in the tactile feedback system 130 receiving a signal identifying a type and amount of tactile feedback to be generated from the application processor 128 or other source. The tactile feedback system generates a PWM or other modulated signal based on the requested tactile feedback at step 304. This could include, for example, the control unit 202 in the tactile feedback system 130 generating a PWM signal with appropriate pulse widths and pulse amplitudes for creating the desired tactile feedback. Of course, other suitable modulation schemes could be used. An actuator is driven using the modulated signal at step 306. This could include, for example, the motor driver 204 in the tactile feedback system 130 driving a motor 206 in an actuator 132 based on the PWM signal.

Vibrations created by the actuator are measured at step 308. This could include, for example, the sensor 134 measuring vibrations created by the actuator 132. Since the sensor 134 can be rigidly connected to the same mechanical connection 122 as the actuator 132, the sensor 134 can rapidly and accurately detect the vibrations created by the actuator 132. Feedback is provided to a modulated signal generator at step 310. This could include, for example, the sensor 134 providing vibration measurements to the control unit 202 in the tactile feedback system 130. The generation of the modulated signal is adjusted based on the feedback at step 312. This could include, for example, the control unit 202 in the tactile feedback system 130 updating a response model and transfer function for the actuator 132, where the model defines how the actuator 132 responds to drive signals. The model can be updated when the sensed vibrations created in response to a particular drive signal vary from the predicted vibrations. This could also include the control unit 202 in the tactile feedback system 130 altering the PWM or other modulated signal so as to create vibrations that are more closely matched to the desired tactile feedback. The method 300 can continue repeating steps 306-312 until a new request is received or the current tactile feedback is terminated.

Although FIG. 3 illustrates one example of a method 300 for providing closed-loop haptic or other tactile feedback, various changes may be made to FIG. 3. For example, while shown as a series of steps, various steps in FIG. 3 could overlap, occur in parallel, occur in a different order, or occur multiple times.

In some embodiments, various functions described above are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory.

It may be advantageous to set forth definitions of certain words and phrases used throughout this patent document. The term "couple" and its derivatives refer to any direct or indirect communication between two or more elements, whether or not those elements are in physical contact with one another. Terms such as "receive" encompass both direct and indirect communication. The terms "include" and "comprise," as well as derivatives thereof, mean inclusion without limitation. The term "or" is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A system comprising:
   an actuator configured to generate vibrations for creating tactile feedback to a user;
   a sensor configured to measure the vibrations generated by the actuator;
   a tactile feedback system configured to drive the actuator in order to generate the vibrations, the tactile feedback system also configured to adjust the driving of the actuator in response to measurements from the sensor; and
   the tactile feedback system is configured to over-drive a motor of the actuator until the measurements from the sensor indicate that vibrations are detected by the sensor; and
   the tactile feedback system is configured to back-drive the motor of the actuator until the measurements from the sensor indicate that no vibrations are detected by the sensor.

2. The system of claim 1, wherein the tactile feedback system comprises:
   a control unit configured to generate a modulated signal for driving the actuator; and
   a driver configured to drive the actuator based on the modulated signal.

3. The system of claim 2, wherein the driver comprises an Hbridge motor driver.

4. The system of claim 2, wherein the control unit is configured to use a model for the actuator to generate the modulated signal.

5. The system of claim 4, wherein the control unit is further configured to update the model based on the measurements from the sensor.

6. The system of claim 1, wherein:
   the actuator comprises a motor configured to drive an eccentric mass; and
   the sensor comprises at least one of: an accelerometer and a gyroscope.

7. A method comprising:
   generating a drive signal for causing an actuator to produce vibrations to thereby create tactile feedback to a user;
   measuring the vibrations using a sensor;
   adjusting the drive signal in response to measurements from the sensor; and
   wherein generating the drive signal comprises:
   over-driving a motor of the actuator until the measurements from the sensor indicate that vibrations are detected by the sensor; and
   back-driving the motor of the actuator until the measurements from the sensor indicate that no vibrations are detected by the sensor.

8. The method of claim 7, wherein generating the drive signal comprises:
   generating a modulated signal; and
   driving the actuator based on the modulated signal.

9. The method of claim 8, wherein driving the actuator comprising driving the actuator using an H-bridge motor driver.

10. The method of claim 8, wherein generating the modulated signal comprises generating the modulated signal using a model for the actuator.

11. The method of claim 10, further comprising:
    updating the model based on the measurements from the sensor.

12. The method of claim 7, wherein:
    the actuator comprises a motor configured to drive an eccentric mass; and
    the sensor comprises at least one of: an accelerometer and a gyroscope.

13. An apparatus comprising:
- a tactile feedback system configured to drive an actuator in order to generate vibrations for providing tactile feedback to a user, the tactile feedback system also configured to adjust the driving of the actuator in response to vibration measurements from a sensor;
- the tactile feedback system is configured to over-drive a motor of the actuator until the vibration measurements from the sensor indicate that vibrations are detected by the sensor; and
- the tactile feedback system is configured to back-drive the motor of the actuator until the vibration measurements from the sensor indicate that no vibrations are detected by the sensor.

14. The apparatus of claim 13, wherein the tactile feedback system comprises:
- a control unit configured to generate a modulated signal for driving the actuator; and
- a driver configured to drive the actuator based on the modulated signal.

15. The apparatus of claim 14, wherein the driver comprises an H-bridge motor driver.

16. The apparatus of claim 14, wherein the control unit is configured to use a model for the actuator to generate the modulated signal.

17. The apparatus of claim 16, wherein the control unit is further configured to update the model based on the measurements from the sensor.

* * * * *